Oct. 13, 1942.  P. F. ROSSMANN  2,298,647
BROACHING MACHINE
Filed Aug. 28, 1940  2 Sheets-Sheet 1
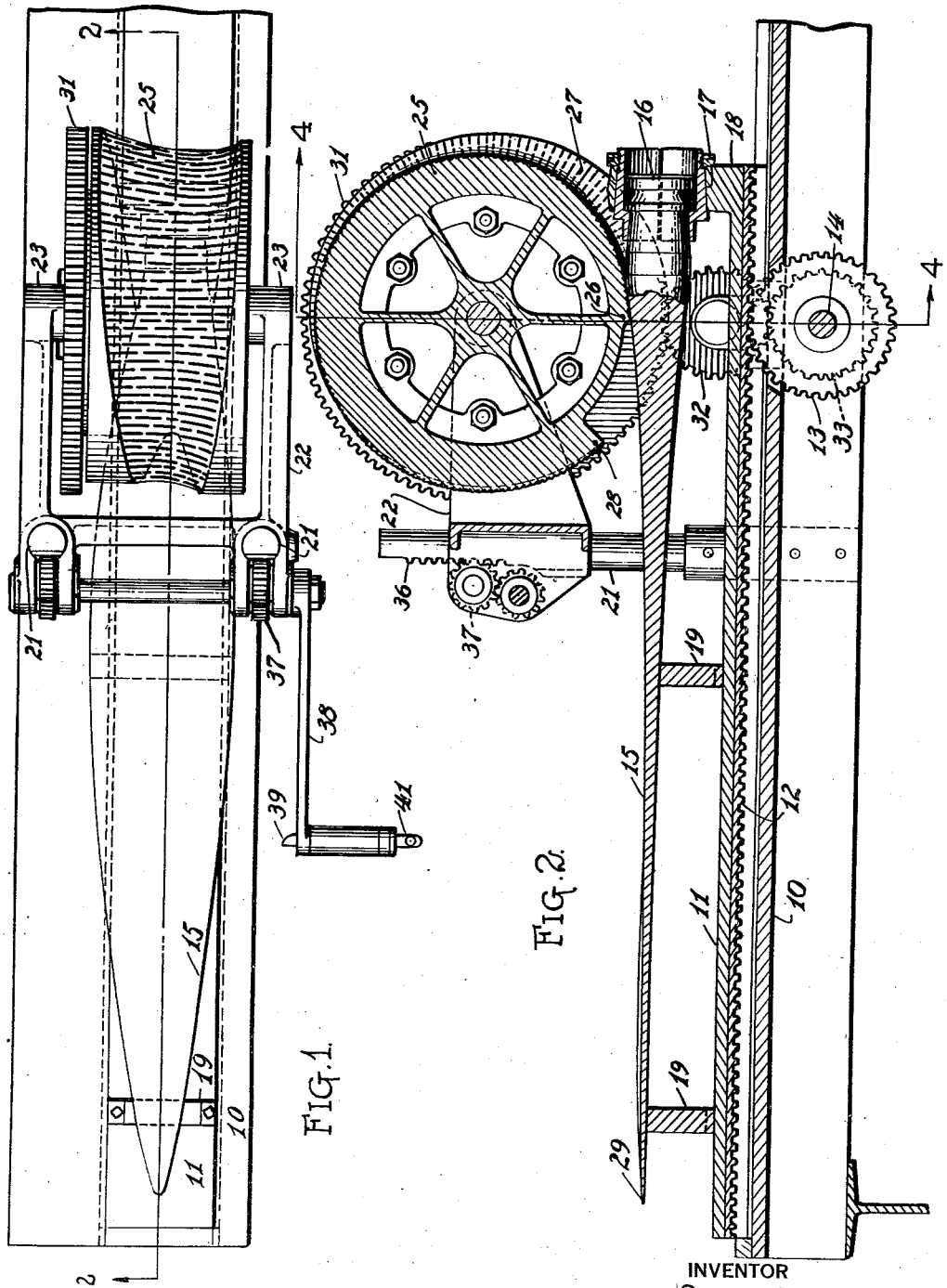
INVENTOR
PETER F. ROSSMANN.
BY
ATTORNEY Oct. 13, 1942.    P. F. ROSSMANN    2,298,647
BROACHING MACHINE
Filed Aug. 28, 1940    2 Sheets-Sheet 2.
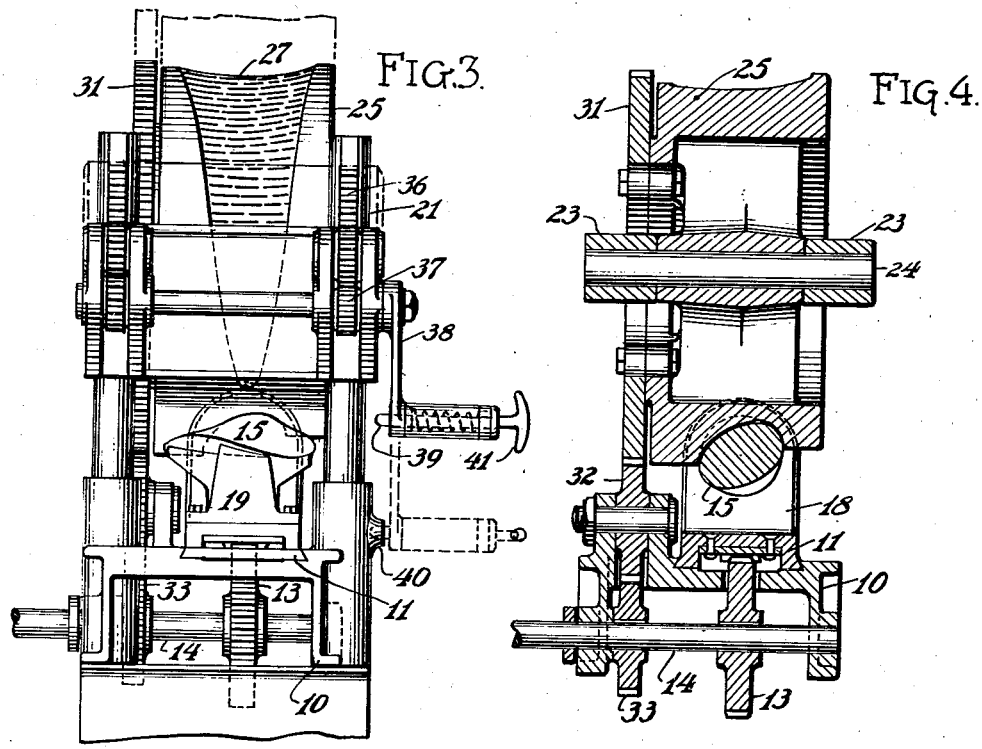
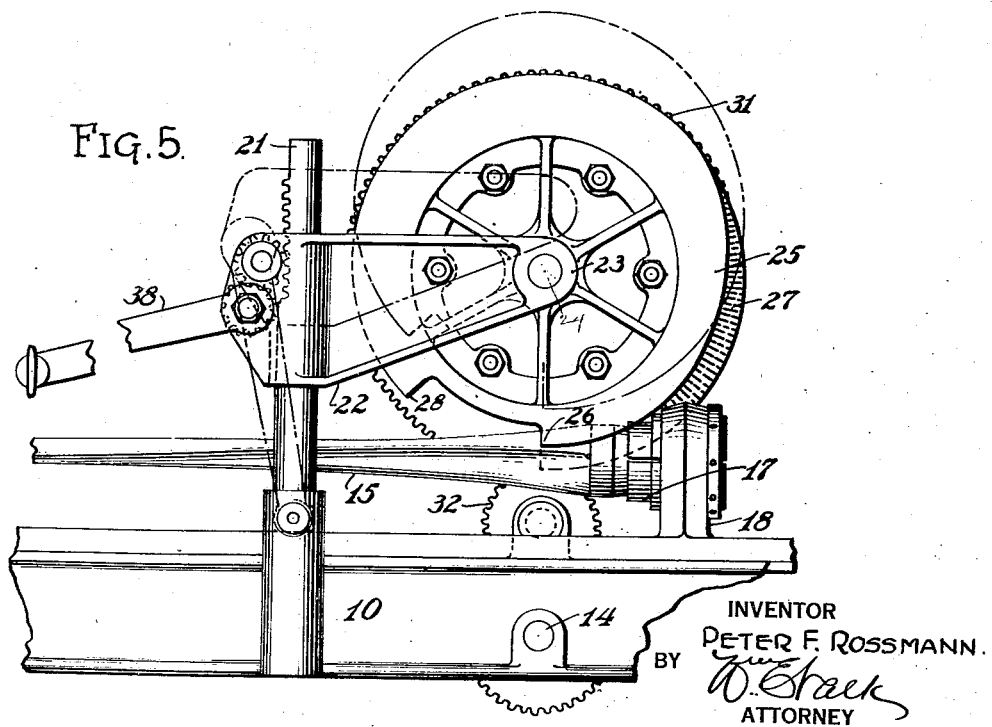
INVENTOR
PETER F. ROSSMANN.
BY
ATTORNEY Patented Oct. 13, 1942

2,298,647

UNITED STATES PATENT OFFICE 2,298,647

BROACHING MACHINE

Peter F. Rossmann, Snyder, N. Y., assignor to Curtiss-Wright Corporation, a corporation of Delaware Application August 28, 1940, Serial No. 354,494

10 Claims. (Cl. 90—33)

This invention relates to a machine tool of the generating broach type and in particular comprises a broaching machine for producing irregularly shaped objects.

There are many and varied irregularly shaped objects which are adapted to be formed by a machine of the character disclosed, but the particular machine herein shown is designed for shaping and contouring an aircraft propeller blade which, as is well known in the art, comprises a substantially cylindrical root section which blends into a flattened blade section, the latter twisting throughout the length of the blade and having an airfoil cross sectional profile which also varies throughout the length of the blade. Blade blanks ordinarily are produced in rough blade form by forging or die pressing and machine cutting operations are necessary to reduce the blade blank accurately to its final dimensions. These machining operations in the past have been accomplished by hand work or by special cam milling machines which are rather slow in operation. Accordingly, an object of this invention is to provide a propeller blade generating machine which utilizes the principles of broaching and which will be capable of finish cutting a propeller blade to final form quickly and accurately. A further object of the invention is to provide a broaching machine in which the work is traversed linearly with respect to a movable broach and in which the broach comprises a rotatable member whose periphery is formed progressively in complement to the desired profile of the work piece; the work piece and the broach are moved in synchronism in opposite directions so that broaching teeth engage the work piece in such relation that the work piece will be generated to the desired contour.

A further object of the invention is to provide a novel form of machine tool which includes a plurality of broaching cutters which sequentially engage a work piece moved with respect to the cutters.

Further objects of the invention will become apparent in reading the annexed detailed description in connection with the drawings, in which:

Fig. 1 is a plan of a rotary broaching machine;
Fig. 2 is a section on the line 2—2 of Fig. 1;
Fig. 3 is an end view of the machine;
Fig. 4 is a section on the line 4—4 of Fig. 2; and
Fig. 5 is a side elevation of a portion of the machine.

The machine comprises a bed 10 along which a work table 11 is linearly movable, the work table carrying a rack 12 engaged by a gear 13 on the bed which is power driven through a shaft 14. Upon the table 11 work to be formed is mounted, and in the particular showing this work comprises a propeller blade blank 15 secured at its root end 16 in a clamp fitting 17 mounted in a table boss 18. Other portions of the blank 15 are supported by appropriately spaced blocks 19 bolted to the table 11.

The bed is provided with upright standards 21 on either side thereof upon which a bearing bracket 22 is slidably mounted, this bracket comprising bearings 23 in which a shaft 24 is carried for rotation, the shaft having mounted thereon a rotary broach 25. This broach, as will be seen in Figs. 4 and 5, is provided with peripheral cutting teeth and the effective circumference of the broach will be somewhat greater than the length of the blade blank 15. One portion of the broach as at 26 will be formed in complement to the desired blade profile close to the root end, and as the periphery of the broach progresses counterclockwise, as in Fig. 2, the broach teeth 27 thereof will be progressively formed in complement to progressive stations of the propeller blade from root to tip until said teeth reach a point 28 whereat they are complementary to the desired blade profile at the tip end 29 of the blade 15. It will be seen that the points 26 and 28 are circumferentially spaced to allow of initial setting of the broach upon the blade blank with clearance therebetween so that the starting point for a broaching operation may be readily established.

The broach 25 has secured thereto a large gear 31; this is engaged by an idler gear 32 mounted in bearings secured to the bed 10 and in turn driven by a gear 33 keyed to the power shaft 14. By appropriate setting up of the gear train, the speed of rotation of the broach may be synchronized with the speed of travel of the table 11 so that, as the work piece travels longitudinally from the root 16 to the tip 29, the broach 25 rotates nearly a full revolution from the teeth 26 to the teeth 28.

In order to set up a new work piece in the machine, the broach carrying brackets 22, along with the broach, are vertically movable upon the standards 21 through the medium of rack teeth 36 formed on the standards engaged by pinions 37 journalled in the bracket 22 which may be rotated through means of a handcrank 38 provided with a locking dog 39 engageable with a latch 40 on a stationary part of the machine, the dog 39 being actuated by a hand piece 41. When a blank is to be set up in the machine, the dog 39 is released from the latch 40 and the bracket 22 is elevated. The work piece 15 is then set up and the bracket 22 is lowered and the dog 39 engaged with the latch 40. Then, power may be applied to the shaft 14, whereat the rotating broach passes over the blank 15 and removes metal therefrom to profile the blank to the desired contour, after which the bracket is again raised, the finished blank removed, and a new blank installed.

It will be desirable to provide a relief portion at the starting point 26 of the broach so that the initial setup may be made with the broach periphery and the blank in clearance relation. By interchanging broach wheels 25 and by suitably changing the gear train by which the broach wheel is driven, formation of both sides of the propeller blank may be effected and the machine may be made sufficiently flexible to carve various objects other than propeller blades.

It may be considered that this broaching machine is a cross between a milling machine and a broaching machine having some of the characteristics of both but having the added characteristic, common to neither basic machine, of allowing the formation of irregularly profiled objects in a single pass of a work piece through the machine. It is obvious that the broach wheels 25 will be highly specialized and rather expensive cutting tools but their cost and complexity, from a toolmaker's standpoint, would be fully justified where large production of a single form of article is desired. It is considered that a rotary broaching machine of the general type disclosed could be readily used on any kind of metal propeller blades—with solid or hollow aluminum alloy or steel blades—and the precision formation of the blades would be a function of the precision of the broaching wheel and the sturdiness and drive precision of the machine as a whole. If desired, the periphery of the broaching wheel may be made in segmental form with inserted individual cutters, each cutter being formed individually to its proper profile. Thus, cutters could be replaced when worn without scrapping the whole wheel.

The drawings show a rotary broaching machine of somewhat rudimentary form but it will be obvious to those familiar with the machine tool art that the principle of rotary broaches is adequately disclosed thereby. Any suitable power feed or gearing may be adapted in the machine according to conventional machine tool practice.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A machine for profiling elongated irregular work pieces such as propeller blades, comprising a work table, means for translating said table, a rotary broach wheel having a portion of its circumference provided with cutting elements each transversely profiled to a different shape to represent a desired work profile at successive points along the work, and means to synchronize rotation of the broach and translation of the work table.

2. A machine for profiling elongated irregular work pieces such as propeller blades, comprising a work table, means for translating said table, a rotary broach wheel having a portion of its circumference provided with cutting elements each transversely profiled to a different shape to represent a desired work profile at successive points along the work, means to synchronize rotation of the broach and translation of the work table, and means to feed the broach wheel normally of the table.

3. A rotary broaching machine comprising a wheel having a plurality of peripherally disposed cutting elements, consecutive elements having varying profiles and being spaced differently from the wheel center, a translatable work table, means to support said wheel above the table including means to move the wheel toward and away from the table, and means to coincidentally rotate said wheel and to translate the table at such rates that the peripheral speed of the wheel is no greater than the linear speed of the table.

4. A rotary broaching machine comprising a wheel having a plurality of peripherally disposed cutting elements, consecutive elements having varying profiles and being spaced differently from the wheel center, a translatable work table, means to support said wheel above the table including means to move the wheel toward and away from the table, and means to coincidentally move the table and rotate the wheel at such speeds that the cutting-element-carrying portion of the wheel passes a given point in the same time as a length of table equivalent to the length of the article to be formed passes a given point.

5. A rotary broach for forming an irregularly shaped elongated object comprising a series of cutting elements arranged around the periphery of a wheel, each cutting element being different in shape from the next, the cutting elements being disposed at different distances from the wheel center, a work holder movable tangentially of the wheel during one revolution thereof, and means to hold the blank and wheel in predetermined relationship during said tangential pass.

6. A rotary broach for forming an irregularly shaped elongated object comprising a series of cutting elements arranged around the periphery of a wheel, each cutting element being different in shape from the next, the cutting elements being disposed at different distances from the wheel center, and a work holder movable tangentially of the wheel during one revolution thereof in a direction opposite to the direction of travel of the cutting elements.

7. A rotary broaching machine comprising a support and a linearly travelling table, a substantially spirally formed rotatable broach wheel journalled in the support, means for traversing the table in one direction, and means for coincidentally rotating the broach wheel, so that that part closest to the table travels in a direction opposite to that of the table, and so that said broach wheel makes no more than one revolution during one complete traverse of the table in said one direction.

8. A rotary broach for forming irregularly shaped objects comprising a wheel having a series of cutting elements arranged around its periphery, the elements being shaped differently from one another and being disposed at different distances from the wheel axis, an object-holding device traversable with respect to the wheel rim, means to support and rotate the wheel, and mechanism to synchronize one pass of the holding device with one revolution of the wheel.

9. A broaching apparatus for forming an irregularly shaped work piece comprising a cutter assembly including serially arranged cutter elements of successively different form, means to pass said cutter assembly over a work piece and means to move the cutter and work piece in timed relation in such manner that each cutter element engages a different length increment of the work piece.

10. A broaching apparatus comprising a cutter wheel including cutter elements of successively different transverse form and spaced at successively different distances from the wheel center, means to rotate said wheel, a work holder movable tangentially of the wheel, and means to move the work holder in synchronism with the wheel whereby the work held in the holder makes one pass relative to the cutter wheel as the cutter wheel makes substantially one revolution.

PETER F. ROSSMANN.